United States Patent [19]

Krutz et al.

[11] Patent Number: 4,693,125

[45] Date of Patent: Sep. 15, 1987

[54] FORCE DETECTING AND INDICATING APPARATUS FOR FISHING RODS

[75] Inventors: Gary W. Krutz, West Lafayette; James W. Kruse, Fort Wayne, both of Ind.

[73] Assignee: Outdoor Electronics, Ltd., West Lafayette, Ind.

[21] Appl. No.: 785,579

[22] Filed: Oct. 8, 1985

[51] Int. Cl.[4] .................... A01K 97/12; G01L 5/10
[52] U.S. Cl. ................... 73/862.39; 73/862.53; 43/17
[58] Field of Search ........... 73/862.39, 862.44, 862.53, 73/862.54; 43/4, 17

[56] References Cited

U.S. PATENT DOCUMENTS

| | | | |
|---|---|---|---|
| 4,366,874 | 1/1983 | Pidoux et al. | 73/862.67 X |
| 4,418,489 | 12/1983 | Mathauser | 43/17 |
| 4,422,258 | 12/1983 | Adams et al. | 43/17 |
| 4,445,786 | 5/1984 | Jackson | 368/10 |
| 4,562,746 | 1/1986 | Petit | 73/862.23 |

FOREIGN PATENT DOCUMENTS

2918949  11/1980  Fed. Rep. of Germany .......... 43/17

Primary Examiner—Charles A. Ruehl
Attorney, Agent, or Firm—Emrich & Dithmar

[57] ABSTRACT

A microprocessor controlled force detecting and measuring apparatus for use with a fishing rod, detects deflection of the rod caused by forces at the tip of the rod and computes and displays information such as when a fish bites, the time which elapsed in catching the fish, the maximum force or pull on the line, the force-time product over the time interval that the fish is being caught, and the weight of the fish caught, a keyset enabling selection of the information to be displayed and entry of commands to the microprocessor. The apparatus also detects the presence of slack line during a fishing operation, and aids in setting drag of the fishing reel.

23 Claims, 8 Drawing Figures

FORCE DETECTING AND INDICATING APPARATUS FOR FISHING RODS

BACKGROUND OF THE INVENTION

This invention relates to fishing apparatus and more particularly to a force detecting and indicating apparatus for use with a fishing rod for detecting deflection of the rod caused by forces on the rod and calculate various data and indications for the fisherman.

Improvements in fishing apparatus have been, in general, directed to new configurations or materials for the fishing rod, the fishing reel, the fishing lines or lures, etc. While improvements of this type provide the fisherman with better equipment, enhancing his chance of hooking and landing fish, the basic fishing equipment presently in use provides the fisherman with no indication of the amount of time and effort expended in catching a fish. Such information would make the sport of fishing more competitive and add a new dimension to the sport of fishing.

Thus, it would be desirable to have an apparatus for detecting and measuring the force and work or effort of a fisherman in catching fish. It would further be desirable to have an apparatus which enables more precise indication of when a fish has been hooked, indicating when the fish may be running toward or away from the fisherman as well as how hard the fish is fighting. It would further be desirable to have an apparatus which indicates the amount of time elapsed in catching a fish, the hardest pull on the line during the fishing operation and an apparatus which not only aids in setting of the drag of the reel it also allows the weight of the caught fish to be quickly and easily displayed visually for the fisherman.

SUMMARY OF THE INVENTION

The present invention provides a force detecting and indicating apparatus for use with a fishing rod for detecting deflection of the rod caused by forces on the rod and computing and displaying information such as when a fish bites, the time which elapsed in catching the fish, the maximum force or pull on the line during the fishing operation, the force-time product over the time interval that the fish is being caught, and the weight of the fish caught.

In accordance with the invention, an apparatus for detecting and measuring forces on a fishing rod such as due to the pull on a fishing line attached to the rod, comprises transducer means for detecting the deflection of the fishing rod caused by forces on the fishing rod and providing analog signals representative of such forces; signal conditioning means coupled to the transducer means for converting the analog signals to digital signals; digital signal processing means coupled to the signal conditioning means, and having receiving means for receiving the digital signals and computing means for computing the values of the forces on the fishing rod which are causing the deflection of the rod. A user interface means including indicating means is controlled by the signal processing means to provide an indication of at least a fish-on-line condition and the maximum value of force detected due to such condition.

DESCRIPTION OF THE PREFERRED EMBODIMENT

Referring to FIGS. 1-4, the force detecting and measuring apparatus 10 provided by the present invention is shown mounted on a fishing rod 12 near the handle 14 of the rod. The apparatus detects deflection of the fishing rod 12 caused by forces on the rod, measures the forces and displays acquired information to the fisherman. The apparatus 10 includes a housing 15 which mounts a display unit 16 for displaying the information and a key set 18 for selecting information to be displayed and for entering command information to electronic circuits contained within the housing 15 of the apparatus 10.

Briefly, the force detecting and measuring apparatus 10 includes a microprocessor system 22 contained within the housing 15, which detects when a fish "bites" or a "hit", computes "fight time", that is, the time which elapsed in catching the fish, and computes a FISH POWER number (FISH POWER is a trademark of the assignee of this application) which is proportional to the integral of the force over the fight time, times a constant. The apparatus also determines the hardest pull of the fish and detects the presence of slack line during a fishing operation. After a fish is caught, the apparatus can be used to compute the weight of the fish. Also, the apparatus aids in setting the drag of the fishing reel.

Referring to FIGS. 1-4, for the purpose of detecting the deflection of the fishing rod caused by forces on the rod, the apparatus 10 includes a transducer indicated generally by reference numeral 20 which provides an output signal proportional to the forces detected. The transducer 20 comprises a Hall effect sensor including a Hall effect device 32 and a magnet 33 which are placed in close proximity. The Hall effect device is located within a forwardly extending arm portion 34 of the housing. The magnet 33 is carried by a cantilever mounted member 35 at its end 35a. The upper surface 36 of member 35 engages the under surface of the rod 12. As the rod 12 bends in response to forces applied to the rod, the separation between the magnet 33 and the Hall effect device 32 varies with the deflection of the rod. Thus, the strength of the magnetic field at the Hall effect device varies, resulting in a varying output signal of the Hall effect device. The output signal of the Hall effect device is applied to electronic circuits of the apparatus which are contained within the housing 15.

Figure 5:
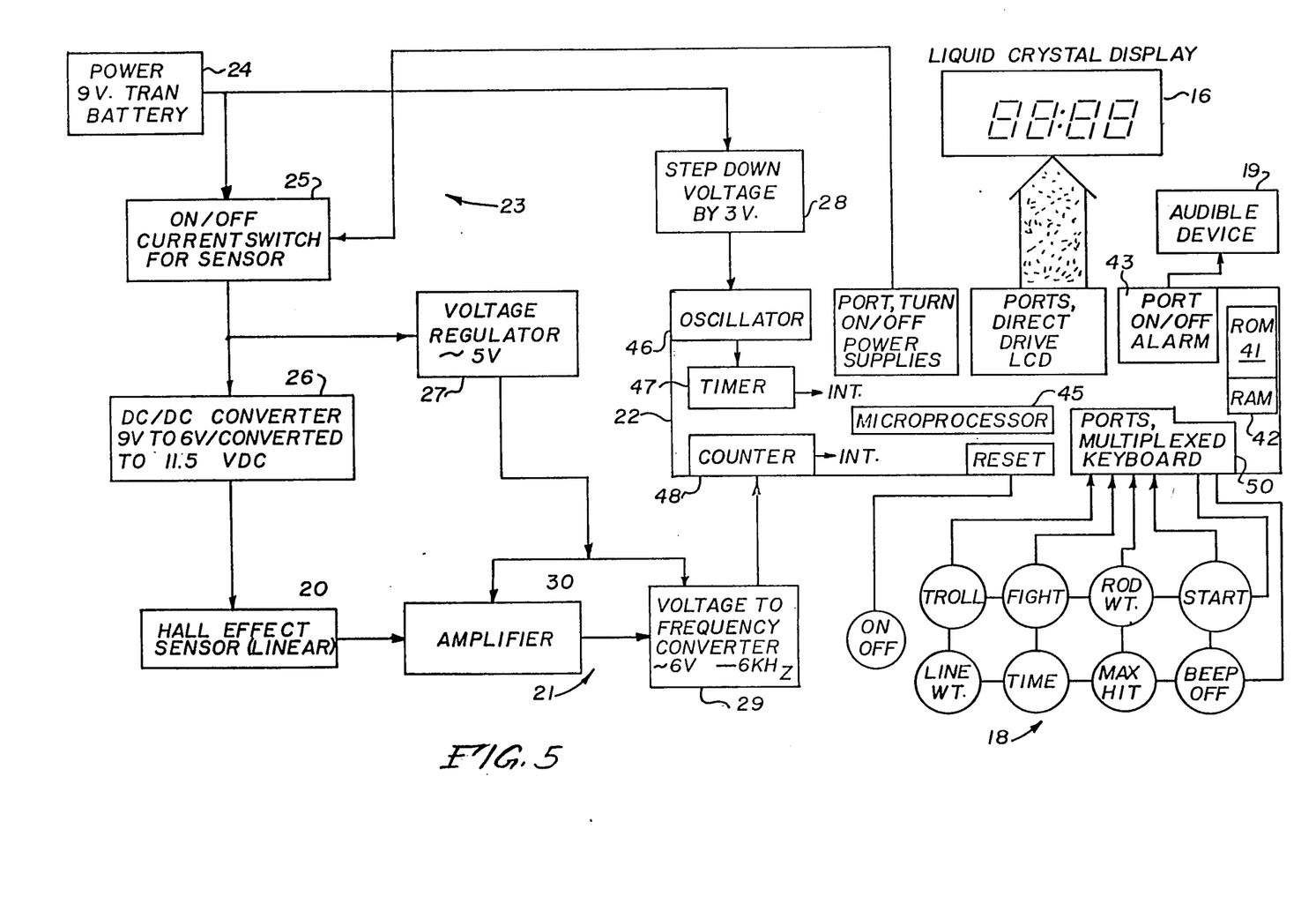
FIG. 5 is a block diagram of electronic circuits of the force detecting and measuring apparatus.

Referring to FIG. 5, there is illustrated a block diagram of the electronic circuits of the apparatus 10 which process the output signal provided by transducer 20. The electronic circuits include a signal conditioning circuitry 21, the microprocessor system 22 and a power supply circuit 23.

The signal conditioning circuit 21 converts the signal provided by the transducer 20 to a form detectable by the microprocessor system 22.

The microprocessor system 22 includes a digital microprocessor 45 which under the control of its operating program processes the deflection information received from the transducer 20 via the signal conditioning circuit 21 and computes the forces on the rod which are causing the deflection and computes statistical parameters about the time and forces involved in fighting, catching and weighing a fish. The microprocessor 45 controls an audible device 19 to provide audible signals to aid the fisherman in detecting a "bite", detecting slack line, and detecting fish-off-line conditions. The microprocessor 45 also computes forces representative of the weight of the fish as will be shown.

The display 16 and keyboard 18 provide a user interface system through which calibration parameters and control functions are entered and the computed weights, time and statistical data are displayed to the user.

The power supply circuit 23 includes a battery 24, an on/off current switch 25, a DC/DC converter 26, a voltage regulator 27 and step down voltage circuit 28. The on/off current switch 25 is connected in series between the output of the battery 24 and the input to the DC/DC converter 26 which converts the battery voltage to 11.5 VDC application to the Hall effect device 32. The battery voltage is also stepped by 3 VDC by step down voltage circuit 28 for application to the microprocessor system 22. The voltage regulator 27 provides a regulated voltage to the signal conditioning circuit 21 which comprises a voltage-to-frequency converter 29 and a temperature compensating amplifier 30.

Considering the electronic circuits in more detail, the signal output of the Hall effect sensor 20 is passed through amplifier 30 to voltage-to-frequency converter 29, the transfer function of which is 6 KHz per 6 volts input. The voltage-to-frequency converter 29 provides a signal of a frequency corresponding to the amplitude of the signal output of the Hall effect sensor 20 and thus to the amount of deflection of the rod 12. This frequency representation of the measured deflection is readily processed by the digital microprocessor 45 by counting the cycles of the signal in a given time period.

The microprocessor system 22 includes read only memory 41 for storing the operating program, read/write memory 42 for storing data used by the program, input/output ports 43 for connection to external devices including the display 16, the audible device 19 and the on/off current switch 25 for turning off the apparatus automatically when not in use. Clocking for the microprocessor system 22 is established by an oscillator 46 which drives a timer 47 which provides periodic hardware interrupts to the processor. A software counter 48 with separate input receives the frequency signal from the voltage-to-frequency converter 29.

The keyboard 18 consists of nine key switches including an ON/OFF key, a TROLL key, a FIGHT key, a ROD WT key, a START key, a LINE WT key, a TIME key, a MAX/HIT key and a BEEP OFF key. The ON/OFF key is a direct power on reset input to the microprocessor. The remaining eight keys are scanned on a multiplex basis in a 2×4 matrix via input/output ports 50 of the processor.

Depressing the ON/OFF key once, energizes the apparatus 10 and a subsequent depressing of this key deenergizes the apparatus and resets the microprocessor system 22 to initial conditions for the next operating cycle. The START key is used to establish initial adjustments of the apparatus for calibrating the apparatus to a particular fishing rod being used in a manner to be described. Depressing the BEEP OFF key silences the audible device 19 when desired. Depressing the FIGHT key causes display of the FISH POWER number. Depressing the TIME key causes display of the amount of time taken to catch a fish. Depressing the HIT key causes display of the largest value of force registered during a fishing operation. Depressing the LINE WT key results in the display of a numerical value corresponding to the weight of an object hanging on the fishing line. Depressing the ROD WT key results in the display of a numerical value corresponding to the weight of a fish or other object hanging by a hook 91 (shown by dashed line in FIG. 1) on a fishing rod at a precalibrated position. The TROLL key may be depressed when trolling, casting or fast stream fishing. Depressing this key enters an offset force value which increases the force threshold value that must be exceeded to indicate a fish-on-line condition to compensate for the effect of the moving water to prevent false fish-on-line indications.

The display unit 16 comprises a 4 digit liquid crystal display (LCD) numeric display which may also include custom characters, such as "fish" symbol and/or a "bell" symbol located at the left side (FIG. 2) of the display. The "fish" symbol is turned on to indicate when a hit occurs. The "bell" symbol is turned on whenever the audible device is activated. The numerical information to be displayed by the display unit 16 is selected by depressing one of the keys of the key set 18.

Figure 1:
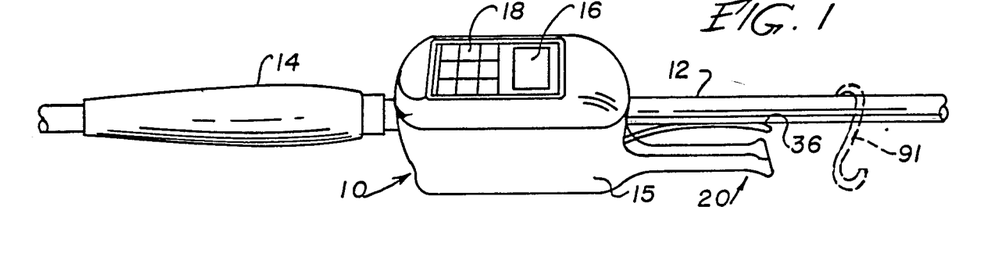
FIG. 1 is a perspective view of a force detecting and measuring apparatus provided by the present invention shown mounted on a fishing rod.
Figure 2:
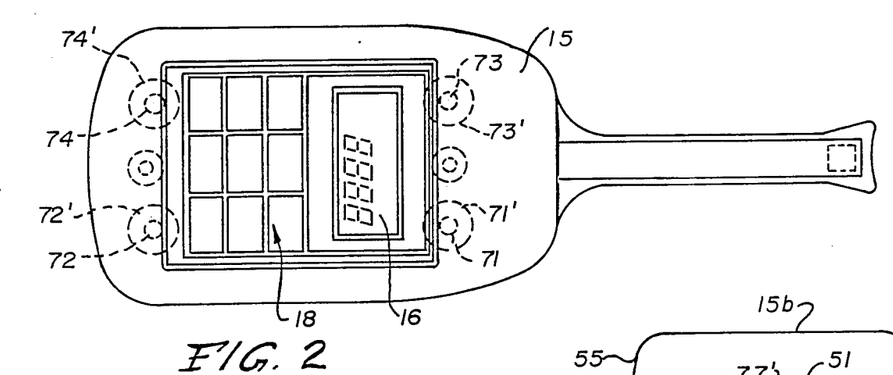
FIG. 2 is a top plan view of the force detecting and measuring apparatus shown in FIG. 1.
Figures 3, 4:
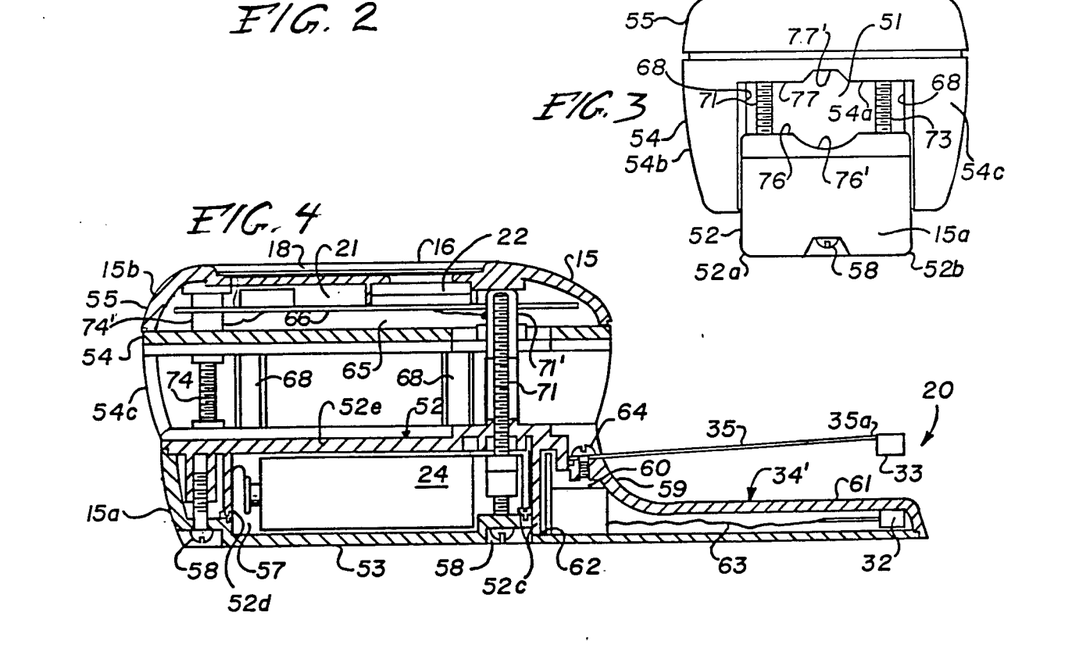
FIG. 3 is an end elevation view of the force detecting and measuring apparatus shown in FIG. 2.
FIG. 4 is a side sectional view of the force detecting and measuring apparatus shown in FIG. 2.

Considering the mechanical construction of the apparatus 10, with reference to FIGS. 1–4, the housing 15 includes a lower housing portion 15a and an upper housing portion 15b which are assembled together to form a generally rectangular container with a longitudinally extending channel 51 shown in FIG. 3 through which the shank of the rod 12 extends when the unit 10 is assembled on the rod 12 as shown in FIGS. 1 and 4.

The lower housing portion 15a includes a base 52 and a cover 53. The upper housing portion 15b includes a base 54 and a cover 55. The lower housing portion base 52 includes a pair of side walls 52a and 52b, a front wall 52c, a rear wall 52d and a top 52e which define a compartment 57 for the battery 24. Compartment 57 is enclosed by cover 53 which is removably attached to the base 52 by a pair of screws 58.

The arm portion 34, which projects forwardly from front wall 52c, includes a hollow sloping shoulder portion 59 forward of compartment 57 which defines a compartment 60 and a tubular portion 61 housing a generally rectangular cross-section. Extending vertically within compartment 60 is a printed circuit board 62 on which is mounted the DC/DC converter.

The Hall effect device 32 is mounted in the forward end of the tubular portion 61 and is connected by conductors 63 to the output of the DC/DC converter 26. The magnet 33 is carried at the free end 35a of member 35, which is of a resilient metal material, and is cantilever mounted at its other end 35b to the upper surface of shoulder portion 59 by way of a screw 64.

The upper housing portion base 54 is a channel-shaped member having a top 54a and generally parallel extending legs 54b and 54c which project downwardly from the top 54a. Cover 55 is an inverted dish-shaped member which is mounted on the top member 54a and permanently affixed thereto in a suitable manner, defining a compartment 65. Cover 55 mounts a printed circuit board 66 on the undersurface thereof, located in the compartment 65 which carries the signal processing circuits 21, the microprocessor system 22, and the display unit 16. The upper surface of cover 55 has a centrally located rectangular aperture which exposes to view the display unit 16 and which is enclosed by membrane keyset 18.

The channel 51 defined by the legs 54b and 54c corresponds to the width of the lower housing portion 15a which is received between the legs 54b and 54c as shown in FIG. 3, with outer surfaces of its side walls slidably engaging the inner surfaces of legs 54b and 54c each of which includes a pair of guide rails 68 which are received in corresponding channels (not shown) formed on the outer surface of legs 54b and 54c.

Four screws 71-74 connect the lower housing portion 15a to the upper housing portion 15b, the threaded ends of the screws 71-74 being received in tapped brass bushings 71'-74' molded into and extending through the base 54 of the upper housing portion 15b. Screws 71-74 (and bushings 71'-74') extend battery connections and the output of the signal transducer 32 from the lower housing portion 15a to the upper housing portion 15b, the brass bushings 71'-74' being electrically connected by wires 75 to appropriate conductors on printed circuit board 66.

Referring to FIG. 3, the upper surface 76 of the lower housing base 52 and the lower surface 77 of the upper housing base 54 have respective longitudinally extending grooves 76' and 77' aligned one with the other for locating the rod 12, the four screws 71-74 being tightened to wedge the rod 12 between the two housing portions 15a and 15b.

Initialization

Referring to FIGS. 1, 3 and 4, whenever the unit is first attached to a rod, or if the location of the unit is changed, or in case of an extreme temperature change, the unit must be recalibrated.

First the unit is attached to the rod 12 between the reel and the first eye, mounting the unit close to the first eye on a thick rod, and close to the reel on a small or graphite rod.

The rod is inserted through the opening 51 and positioned as described above and when in position, the screws 71-74 are tightened so that the unit does not rotate around the rod. The battery 24 is then placed in the battery compartment 57 and attached to the battery connector and the cover 53 is put in place and held in place by screws 58.

To calibrate the unit, ON/OFF key is depressed which activates the unit. Then, after a one to two minute warm-up holding the rod out straight with no weight attached, the START key is held depressed for approximately 3 seconds. The display will show "START" and read zero. After five seconds, the display will read "1". Then a suitable weight, such as a 1 pound weight, is attached as a "unit weight" to the end of the fishing line, with the weight held off of the ground by the fishing rod. The "LINE WT" key is then pressed and the numerical value "1.0" will be shown on the display. After five seconds, the display will read "5" then to calibrate the rod weight, a 5 pound weight is attached to the rod by a hook 91 (FIG. 1) in the place indicated. The hook 91 is generally placed next to the arm 34 of the unit 10. Then, holding the 5 pound weight off the ground with the fishing rod level, the ROD WT key is depressed and the rod held still for approximately five seconds at which time the audible device 24 is activated and the display will show "5.0".

Drag setting of the reel can be determined utilizing the HIT key. In setting or adjusting drag, the end of the line (without lure or hook) is attached to a fixed object. The rod is then pulled up, as in pulling fish from water, until the drag allows the line to slip. The current drag setting can be displayed by depressing the HIT key. If the current drag setting is not satisfactory, the drag can be adjusted and the display process repeated to determine the new drag setting value.

Operating Program

The operating program controls the microprocessor in processing the signal frequency input to calculate the force on the rod and to calculate the various data and to enable indications described above. This includes detecting when a fish bites, detecting a slack line condition, computing "fight time" and the FISH POWER number, computing weight of the fish on line or on rod, and aiding in setting drag of the fishing reel.

Figure 6:
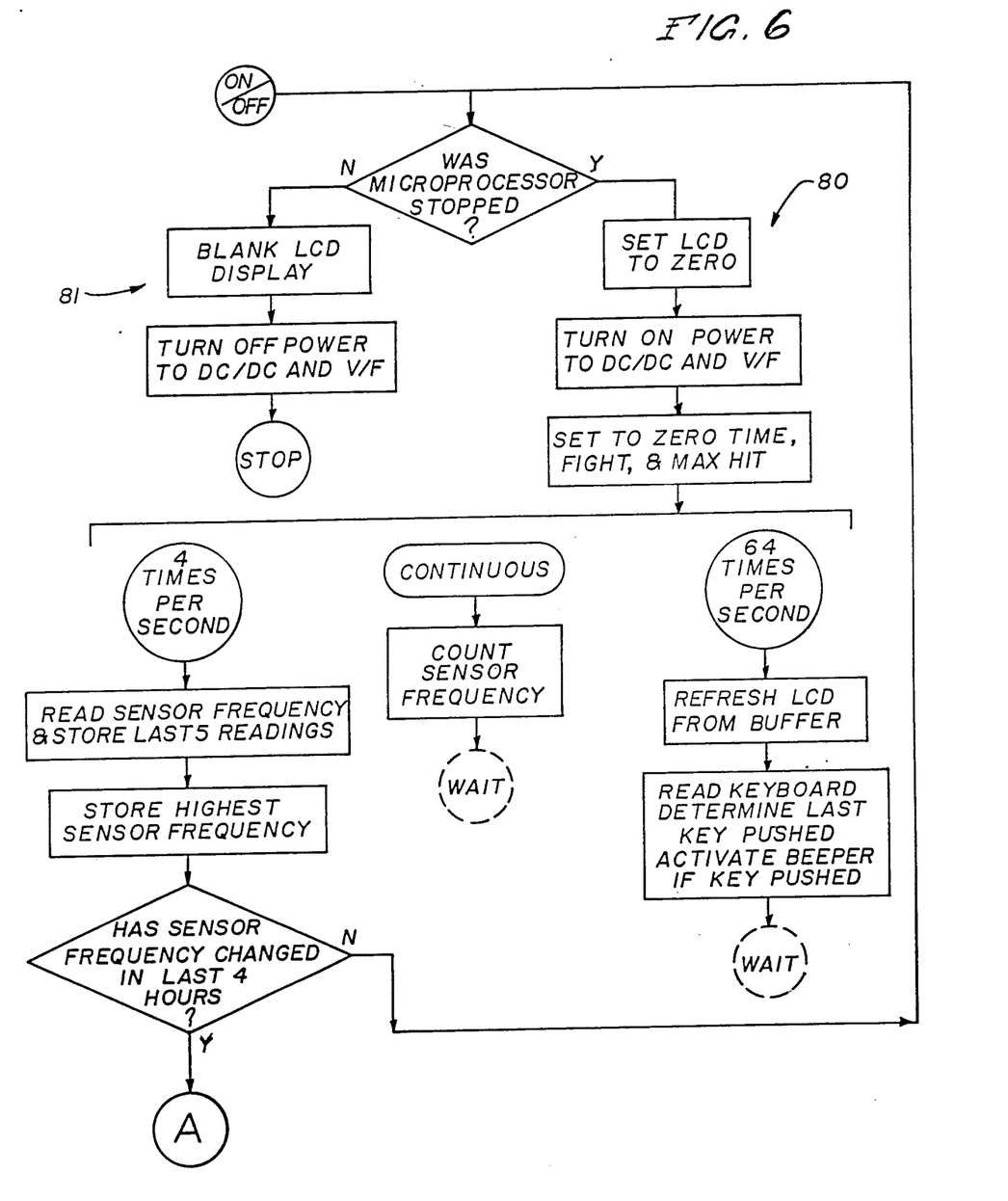
FIGS. 6-8 are flow charts for the microprocessor of the apparatus.

Referring to FIGS. 5 and 6, the flow chart thereshown for the program structure includes a power on section 80 which initializes the system by resetting the program timers and counters to initial values and states. Thus, if the on/off key is depressed and the microprocessor system 22 was deenergized, the display unit 16 is set to zero, the DC to DC converter 26 and the voltage-to-frequency converter 29 are energized by enabling on/off current switch 25 and the "fight time", "fight" and "maximum hit" registers are set to zero. The program structure also includes a power off section 81 which deactivates the system. This includes blanking the display unit 16 and disabling on/off current switch 25 to deenergize the DC to DC converter 26 and the voltage-to-frequency converter 29.

When the system is activated, various sections of the program are provided at scheduled intervals defined by timer 47. The interrupts generated by the timer 47 execute various sections of the program at times which include events occurring sixty-four times per second, events occurring four times per second and events occurring two times per second.

Referring to FIG. 6, once initialized, each 1/64 second, the program is executed to refresh the LCD display and to scan the keyboard for a depressed key and set a flag and activate the audible device if a key has been depressed. Also, the sensor frequency is continuously counted and is read at a rate of four times per second. The last five readings are stored and the current reading is compared to the reading saved as the highest reading previously obtained. If the current reading is greater than the highest reading previously stored, the current reading is then stored as that value. This value is used as the "maximum hit" value.

The current reading is compared to the last four readings. If there is no change, the no-fight timer is incremented. If the timer reaches four hours, this indicates no activity and the system is shut down. Otherwise the fish-on-line subroutine (FIG. 7) is entered.

Figure 7:
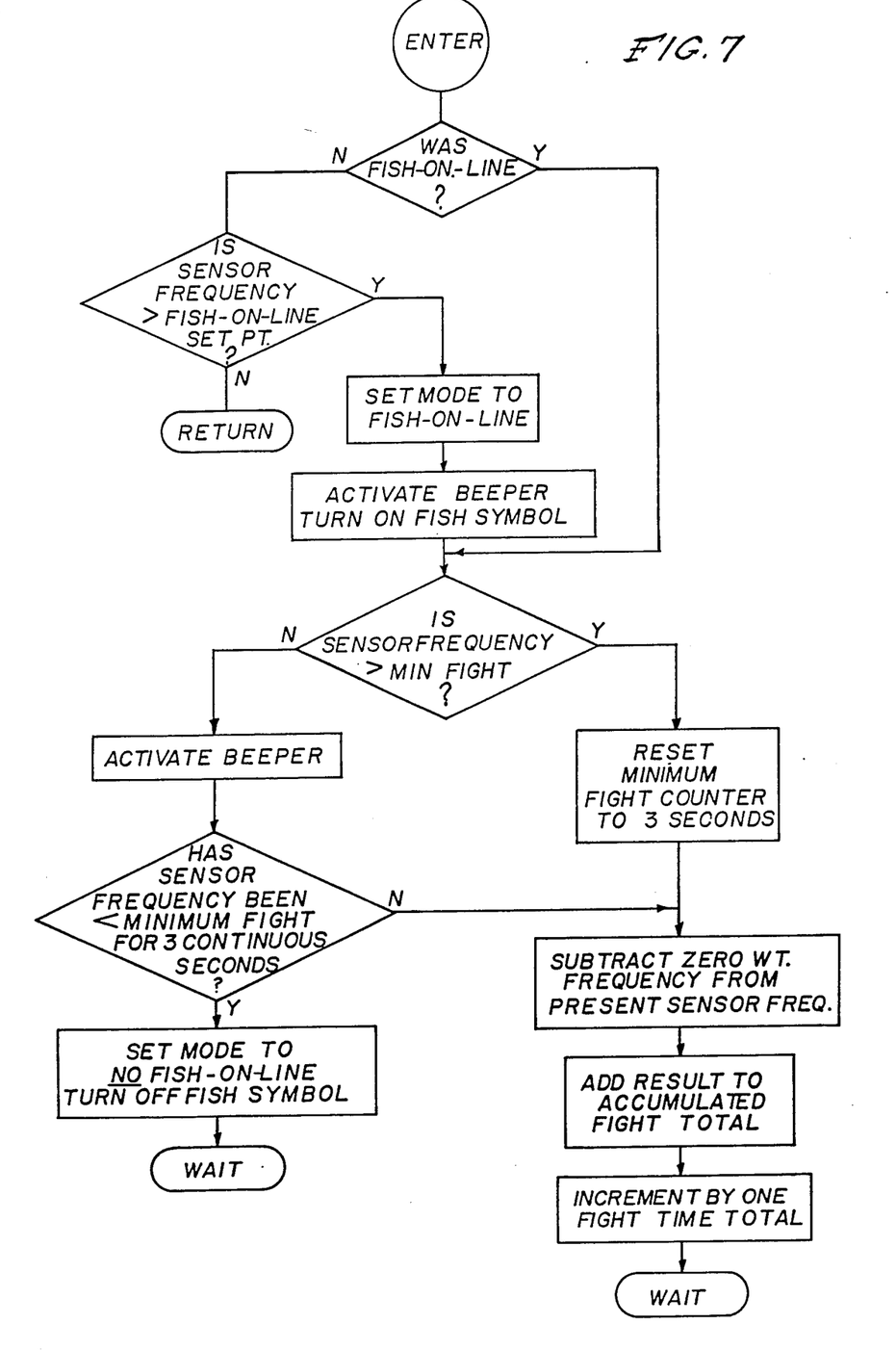

Referring to FIG. 7, if the present force detected exceeds the programmed HIT force, 0.5 plus the troll value, the fish-on-line mode is entered. Upon entering this mode, the audible device is activated for ¾ second indicating that a hit has occurred.

Then a slack line condition is watched for in monitoring the force detected to determine if the force is greater than the minimum fight value which is set at 0.3.

If a slack condition is detected, that is the present force detected being less than 0.3, then the audible device is activated. If the slack condition continues for three continous seconds, then the mode is set to no fish-on-line. If the time period is less than three seconds (or if the present force detected is greater than 0.3), then the fight total is accumulated by adding the value of the present force detected to the previously recorded accumulated force value. Also, the fight time is accumulated by incrementing the fight time total by 1 each time this loop is passed through.

Figure 8:
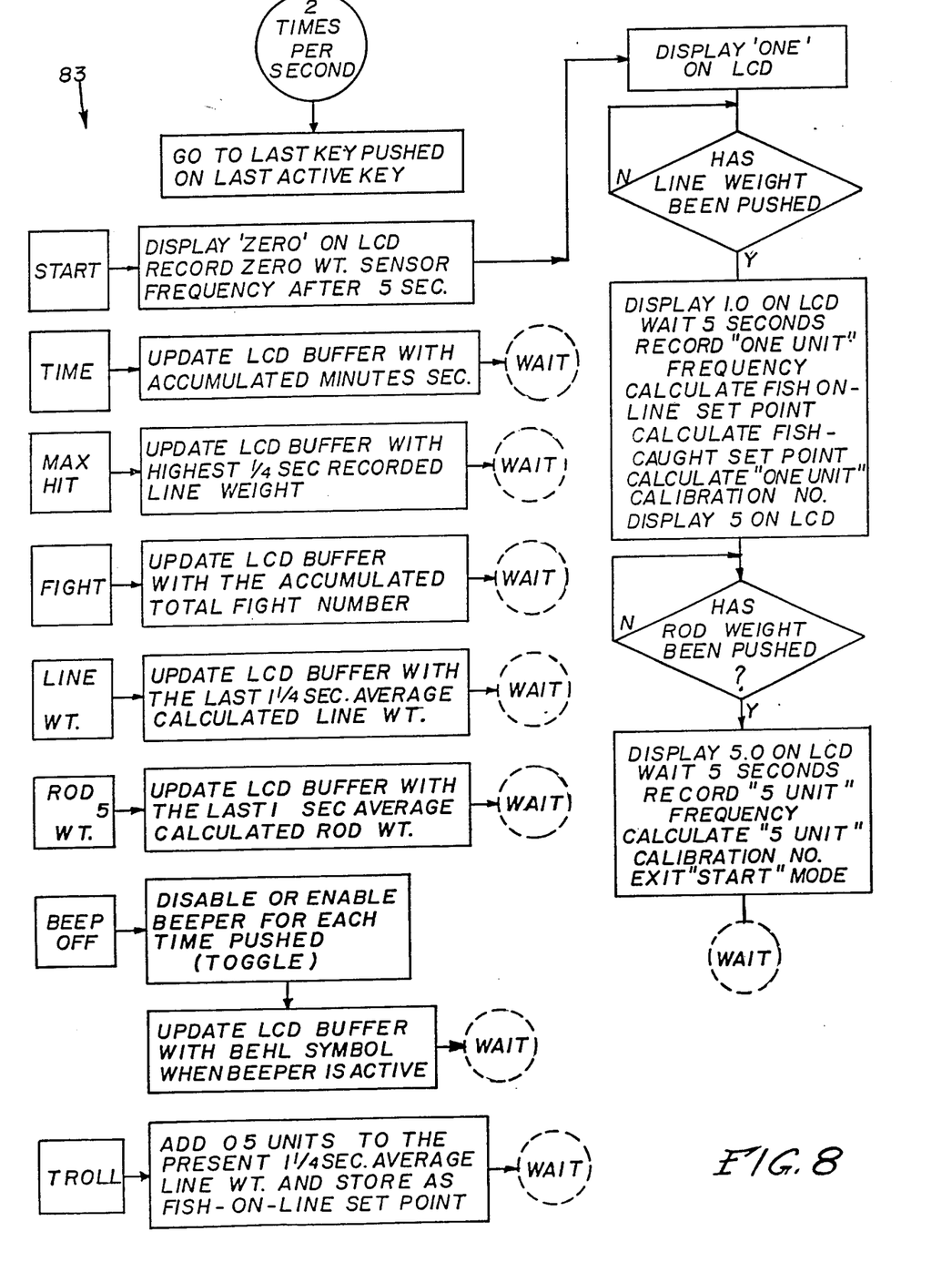

Referring to FIG. 8, events which are conducted two times per second include servicing the keyboard functions. As indicated, the routine of FIG. 6 reads the keyboard sixty-four times per second and detects depression of the key and sets a flag whenever a key is depressed. When the "key depressed" flag is set, the keyboard servicing routine 83 is entered.

Upon entering the keyboard servicing routine, the program proceeds to the last key depressed or the last active key. If the active key was the START key, the display is set to zero and, after a five second delay, the zero weight sensor frequency is stored. Then the program continues with the initialization routine, displaying the numeral "1" on the display unit. Then the program waits until the LINE WT key has been depressed. Once depressed while displaying the numeral "1.0" on the display, the average force detected over a five second interval is calculated. This value, which is the average of five samplings of force value during the last 1.25 seconds of elapsed time, is stored as the initialized unit value of force measured. The fish-on-line setpoint and the fish-caught line (slack) setpoint values are also calculated. Then the number "5" is displayed on the display unit and the program waits until the key ROD WT is depressed. When this key is depressed, the numeral "5.0" is displayed on the display unit, the average force detected on the rod is calculated and with the zero rod weight the calibration for the rod weight is stored. The program then exits starting mode.

When the active key is the TIME key, the elapsed fight time is updated, a current elapsed time being obtained from the fight time total register of the microprocessor. Similarly, when the active key is the MAX HIT key, the highest force value is displayed. "Maximum hit" is calculated as the largest deflection detected by the sensor.

If the active key is the FIGHT key, the accumulated total fight number is calculated and displayed. Total fish fight is calculated as the sum of the units forced recorded at a rate of four times per second, over the time duration that the fish-on-line condition exists.

The LINE WT key and the ROD WT key are used in the calibration routine described, and to cause display of the average of the last five force readings determined.

The BEEP OFF key when active will cause the program to disable or enable (that is toggle) the audible device for each time the key is pushed. The "bell" symbol will be displayed when the audible device is activated. Also, the fish symbol character will be displayed whenever the fish-on-line mode is entered.

Finally, when the TROLL key is depressed, the program will cause the threshold value for the fish-on-line condition to be adjusted to the force on the rod plus 0.5 units and this value is stored as the modified fish-on-line set point value.

Having thus disclosed an embodiment of the invention, persons skilled in the art will be able to modify certain of the structure which has been illustrated and to substitute equivalent elements for those illustrated, while continuing to practice the principle of the present invention. For example, other devices could be used to detect bending of the fishing rod. Rod deflection could be detected using a potentiometer, changing capacitance with deflection, moving a core in a coil, etc. Also, force on the fishing line could be determined by measuring the tension of the fishing line to acquire the same information obtained in the disclosed embodiment. Moreover, the analog signal from the sensor could be converted to a digital signal by using an analog-to-digital converter. In addition, instead of attaching the unit to a rod, a sensor, transducer, or any measuring device could be built right into the rod or reel during manufacturing.

It is therefore intended that all such modifications and substitutions be covered as they are embraced within the spirit and scope of the appended claims.

We claim:

1. Apparatus for detecting and measuring forces on a fishing rod due to pull on a fishing line attached to the rod or to weight hanging on the rod, comprising:
   transducer means for detecting the deflection of the fishing rod caused by forces on the fishing rod and providing analog signals representative of such forces;
   signal conditioning means coupled to said transducer means for converting the analog signals to digital signals;
   digital signal processing means coupled to said signal conditioning means, and having receiving means for receiving said digital signals and computing means for computing the values of the forces on the fishing rod which are causing the deflection of the rod; and
   user interface means including indicating means controlled by said signal processing means to provide an indication of at least a rod deflection condition and the maximum value of force detected due to such condition.

2. Apparatus according to claim 1, wherein said signal processing means comprises timing means for timing the duration of a rod deflection condition, said signal processing means controlling said indicating means to provide an indication of the duration of the rod deflection condition.

3. Apparatus according to claim 2, wherein said indicating means comprises a display means controlled by said signal processing means to provide a numerical display representative of the maximum value of force detected and the duration of the rod deflection condition.

4. Apparatus according to claim 3, wherein said signal processing means includes sampling means for sampling said digital signals at predetermined sampling intervals to obtain a plurality of force sample values over a given time duration, said signal processing means including memory means for storing at least a plurality of said force sample values for use in calculating the values of the forces on the fishing rod.

5. Apparatus according to claim 4, wherein said computing means computes a total force value corresponding to the sum total of the force sample values obtained for the time duration of the rod deflection condition and stores the total force value in said memory means.

6. Apparatus according to claim 4, wherein said computing means uses the stored force sample values for calculating an average force value, said memory means storing a set point force value, and wherein said computing means compares said average force value with said set point force value and enables said timing means to initiate timing the duration of a rod deflection condition only when the average force value exceeds the set point force value.

7. Apparatus according to claim 6, wherein said computing means terminates the timing of a rod deflection condition whenever the average force value is less than the set point value for a predetermined interval of time.

8. Apparatus according to claim 6, wherein said user interface means includes select means for controlling said signal processing means to alter the force set point value.

9. Apparatus according to claim 3, wherein said user interface means includes select means for controlling said signal processing means to select the information to be displayed.

10. Apparatus according to claim 9, wherein said select means comprises keyset means including a plurality of keys, each selecting different information for display by said display means.

11. Apparatus according to claim 9, wherein said indicating means comprises an audible device.

12. Apparatus according to claim 9, wherein said select means is operable to control said signal processing means to cause said display means to provide a numerical display of the value of the forces detected over a selected period of time.

13. Apparatus according to claim 12, wherein the forces detected over the selected period of time correspond to the weight of a fish suspended by the fishing line or a weight hanging on the rod.

14. Apparatus according to claim 12, wherein the force detected over the selected period of time is indicative of the drag setting for a reel mounted on the fishing rod.

15. Apparatus for detecting and measuring forces on a fishing rod due to pull on a fishing line attached to the rod or to a weight hanging on the rod, comprising:
transducer means coupled to the rod for detecting the deflection of the fishing rod caused by forces on the fishing rod and providing analog signals representative of such forces;
signal conditioning means coupled to said transducer means for converting the analog signals to digital signals;
digital signal processsing means coupled to said signal conditioning means, and having receiving means for receiving said digital signals, computing means for computing the values of the forces on the fishing rod which are causing the deflection of the rod, and timing means for timing the duration of a rod deflection condition;
user interface means including display means controlled by said signal processing means to provide a digital display of at least the detection of a rod deflection condition and the maximum value of force detected due to such condition.

16. Apparatus according to claim 15, wherein said user interface means further comprises an audible device for providing an indication of a fish-on-line condition.

17. Apparatus according to claim 15, wherein said transducer means comprises a proximity sensing means including a Hall effect sensor and a magnet, means mounting said Hall effect sensor in a parallel spaced relation relative to said rod, and means mounting said magnet in a generally parallel spaced relationship with said Hall effect sensor and engaging the rod to be driven toward and away from said Hall effect sensor with deflection of the rod, causing said Hall effect sensor to produce a voltage which varies in correspondence with deflection of the rod.

18. Apparatus according to claim 17, wherein said signal conditioning means comprises voltage-to-frequency converter means for converting the voltage produced by said Hall effect sensor to a signal the frequency of which varies in correspondence with changes in deflection of the rod.

19. Apparatus according to claim 18, wherein said signal processing means includes counting means for counting cycles of the frequency signal over a time interval and providing a signal output indicative of the force on the rod during such time interval.

20. Apparatus for detecting and measuring forces on a fishing rod, comprising:
transducer means for detecting the deflection of the fishing rod caused by forces on the fishing rod and providing analog signals representative of such forces;
circuit means including signal conditioning means coupled to said transducer means for converting the analog signals to digital signals and digital signal processing means coupled to said signal conditioning means for processing the digital signals and computing the values of the forces on the fishing rod which are causing the deflection of the rod;
user interface means including display means and keyboard means;
and housing means for enclosing said circuit means and for mounting said user interface means in proximity to said circuit means; said housing means being constructed and arranged for mounting on the fishing rod with said user interface means extending in a plane generally parallel to the upper surface of the fishing rod, and said housing means supporting said transducer means in cooperative relationship with the lower surface of the fishing rod for detecting deflection of the fishing rod.

21. Apparatus according to claim 20, wherein said housing has a longitudinal channel defined therethrough, the fishing rod extending through said channel.

22. Apparatus according to claim 21, wherein said housing comprises a lower housing portion and an upper housing portion movable relative to one another for receiving the fishing rod therebetween.

23. Apparatus according to claim 22, wherein said lower housing portion has an arm portion extending generally parallel to the under surface of the fishing rod, said transducer means being supported at an end of said arm portion.

* * * * *